United States Patent [19]
Meginnis

[11] 3,864,199
[45] Feb. 4, 1975

[54] ANGULAR DISCHARGE POROUS SHEET
[75] Inventor: George B. Meginnis, Indianapolis, Ind.
[73] Assignee: General Motors Corporation, Detroit, Mich.
[22] Filed: July 26, 1973
[21] Appl. No.: 382,906

[52] U.S. Cl. .............. 161/112, 29/191.4, 161/116, 161/122, 416/90, 416/97, 416/229, 416/231
[51] Int. Cl. ........ F01d 5/08, F01d 5/18, B32b 3/10
[58] Field of Search ........... 161/116, 122, 112, 110; 416/231, 229, 90, 96, 97; 29/191.4

[56] References Cited
UNITED STATES PATENTS

| | | | |
|---|---|---|---|
| 2,810,671 | 10/1957 | Taylor et al. | 161/122 X |
| 3,554,663 | 1/1971 | Helms | 416/90 |
| 3,560,107 | 2/1971 | Helms | 416/90 |
| 3,606,572 | 9/1971 | Schwedland | 416/90 |
| 3,606,573 | 9/1971 | Emmerson | 416/90 |
| 3,620,643 | 11/1971 | Jones | 416/90 |
| 3,688,833 | 9/1972 | Bykov et al. | 164/283 |
| 3,698,834 | 10/1972 | Meginnis | 416/96 |
| 3,700,348 | 10/1972 | Corsmeier | 416/90 |
| 3,819,295 | 6/1974 | Hauser et al. | 416/97 |

Primary Examiner—Harold Ansher
Attorney, Agent, or Firm—Paul Fitzpatrick

[57] ABSTRACT

A porous laminated sheet for use in hot environments is formed of two layers bonded together, each layer having pores distributed over its surface with the pores of the layers out of register with each other. Bosses distributed over the inner surface of the outer layer or outer surface of the inner layer provide space so that air or other coolant can flow from the pores in one sheet out through the pores in the other. To cause the fluid discharged from the front of the sheet to flow at a substantial angle to the direction perpendicular to the sheet, fluid flowing into the discharge pores is forced to enter from one common direction. The result is that flow from the pores has a significant component of velocity in this same direction. The inner surface of the sheet may have distributed bosses to space it from a support.

4 Claims, 6 Drawing Figures

PATENTED FEB 4 1975 3,864,199
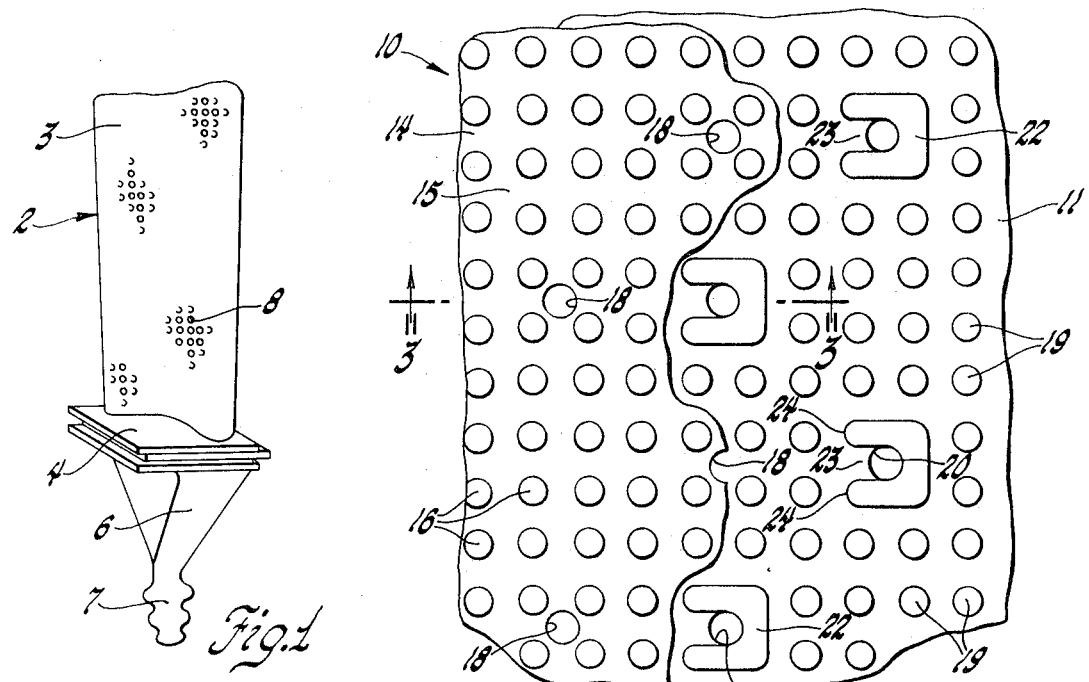
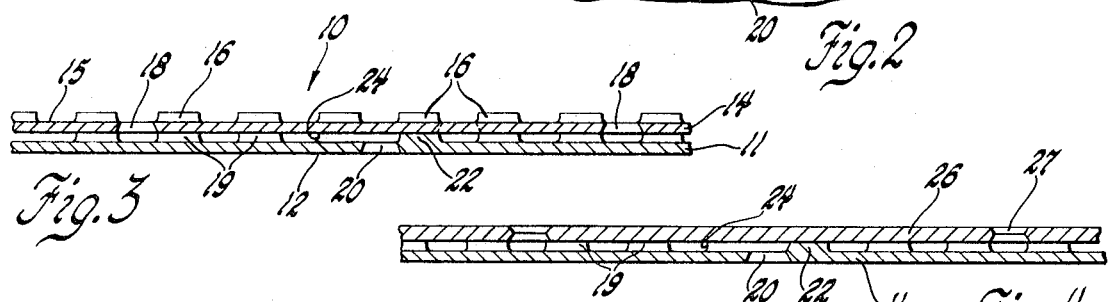
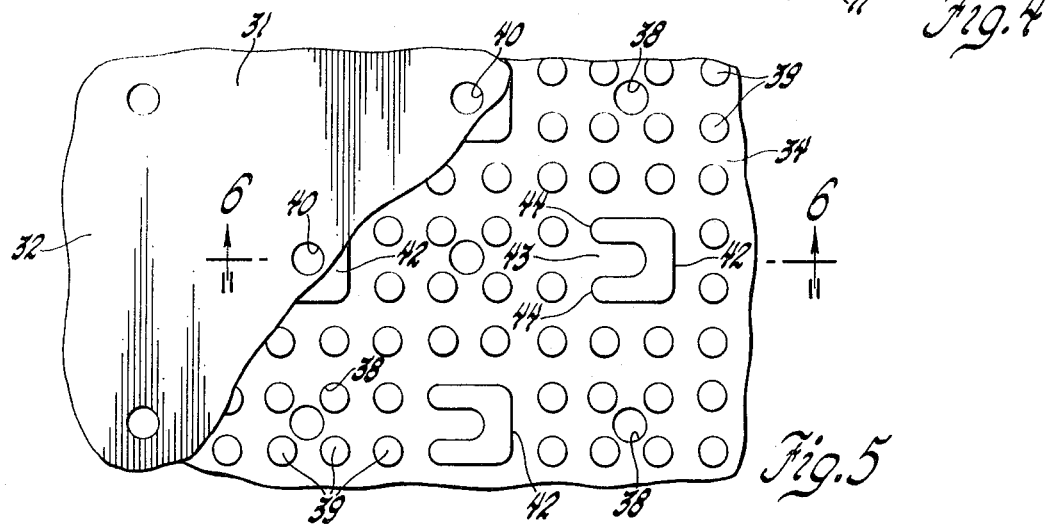
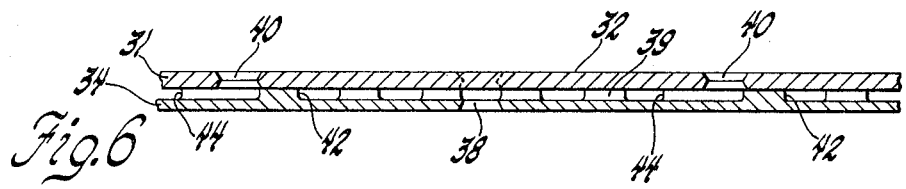

ANGULAR DISCHARGE POROUS SHEET

My invention is directed to improvements in sheets adapted for forming the surface of bodies exposed to high temperature gas and which are to transmit or be cooled by air or other fluid circulated through the sheet and discharged from it. Applications of such sheets include the facings of turbine blades and vanes, shrouds, seal rings, and linings of combustion apparatus and ducts for hot gas such as exhaust ducts of jet engines. In many applications of such material it is desirable to have the gas discharged at an acute angle to the surface of the sheet or, otherwise stated, at a significant angle to the direction perpendicular to the sheet so as to minimize interference with gas flow over the surface of the sheet.

My invention is directed to a simple and effective arrangement of such a cooled or gas-transmitting sheet which makes a satisfactory sheet having only two layers, which improves the bonding characteristics of the layers and the integrity of the sheet after application of heat and pressure to bond it, and which provides a material well suited to application as the boundary of fluid flow paths in hot environments.

By way of background, attention may be invited to the following U.S. patents. Bratkovich et al U.S. Pat. No. 3,584,972, June 15, 1971, discloses varieties of a laminated porous sheet adapted for cooling by flow of fluid into, within, and from the sheet. Emmerson et al U.S. Pat. No. 3,606,573, Sept. 20, 1971, discloses a modification of the laminated material of the Bratkovich et al patent in which flow through the sheet is controlled by configuration of bosses joining the layers such that the cooling air flows through and from the sides of these bosses. Mayeda U.S. Pat. No. 3,700,418, Oct. 24, 1972, discloses a sheet with pores defined by offset intersecting pits etched into opposite faces of the sheet to provide distributed cooling pores with flow from them at an acute angle to the surface of the sheet. Meginnis U.S. Pat. No. 3,698,834, Oct. 17, 1972, discloses varieties of multilayer porous sheets for providing angularity of flow from the sheet. Bowling et al U.S. Pat. No. 3,732,031, May 8, 1973, discloses a turbine vane or blade having a core of cast superalloy covered by a porous facing as described in the Meginnis patent.

The porous sheet described and claimed herein is particularly adapted to be used in the blade or vane arrangement of the Bowling et al patent above but may be also be used in other installations in which a cooled porous sheet is applied as described in the other patents mentioned.

The principal objects of my invention are to provide more desirable and useful porous sheets and to facilitate the production of such sheets.

The nature of my invention and its advantages will be clear to those skilled in the art from the succeeding detailed description of preferred embodiments and the accompanying drawings.

FIG. 1 is an axonometric view of a turbine blade of known overall configuration.

FIG. 2 is a view of a laminated cooled sheet viewed from the rear face, with parts cut away.

FIG. 3 is a sectional view taken on the plane indicated by the line 3—3 in FIG. 2.

FIG. 4 is a view similar to FIG. 3 illustrating a modified structure.

FIG. 5 is a view of a still further modified sheet viewed from the front surface, with parts cut away.

FIG. 6 is a sectional view of the structure of FIG. 5 taken on the plane indicated by the line 6—6.

Referring now to FIG. 1, the turbine rotor blade 2 illustrated there comprises an airfoil or flow-directing portion 3, a platform 4, a stalk 6, and a root 7 of multiple dovetail configuration. Such a blade is mounted by the root in a mating slot on a turbine rotor rim, and the platforms 4 of adjacent blades meet to define an inner boundary of the motive fluid path through the turbine rotor stage. The airfoil 3 may be supported on a strut as explained in U.S. Pat. No. 3,732,031 referred to above, or may be otherwise attached to the platform and root. Means (not illustrated) are provided for supplying air under pressure to the interior of the blades so that it may flow out through distributed pores 8 in the surface of the blade. The cooling air flows into and within the blade facing and then is discharged from these pores to provide convection, transpiration, and film cooling. If the flow of the coolant as discharged from the blade wall is downstream with respect to flow of gas past the airfoil, there is less turbulence, and the turbine is more efficient. Such cooled airfoils having the air discharged from pores in a downstream direction are described in U.S. Pat. Nos. 3,698,834 and 3,700,418 mentioned above as well as U.S. Pat. No. 3,732,031. My invention, therefore, lies in a new form of porous sheet for employment in such situations.

One form of porous sheet which may be employed as an outer facing on a blade strut having a smooth outer surface as illustrated in U.S. Pat. No. 3,732,031 is shown in FIGS. 2 and 3. The sheet 10 comprises a front layer 11 having a front or outer surface 12 over which the motive fluid or other hot gas flows. It also comprises a rear layer 14. The rear or inner surface 15 of the rear layer bears a preferably rectilinear two-dimensional array of distributed bosses 16 which may engage the outer surface of a blade strut or other supporting structure. The bosses are preferably formed by photochemical etching of the rear surface except at the bosses 16. The rear layer also bears distributed fluid entrance pores 18 which are preferably in a rectangular array with each pore at the center of a rectangle defined by four of the bosses 16. These pores are formed by photoetching at the location of the holes from the front surface of the rear layer.

The front layer 11 bears a similar array of bosses 19 which are located so as to register with bosses 16 when the layers are stacked and bonded together. This is highly desirable to provide for direct transfer of pressure through the sheets and the aligned bosses during the bonding by heat and pressure of the surface of bosses 19 to the front surface of the rear layer. The front layer 11 bears a preferably rectangular two-dimensional array of fluid exit pores 20, these being out of register with the fluid entrance pores and preferably disposed at the center of the rectangles defined by the adjacent fluid entrance pores. These fluid exit pores are also disposed at the center of the square or rectangle which would normally be defined by four of the bosses 19. However, at the location of each exit pore a barrier 22 of generally U-shaped outline replaces the four bosses which would otherwise be present. The barriers 22 also are bonded to the inner sheet and each barrier defines an air admission port 23 entering the fluid exit pore. These barriers and air admission ports constrain the air flowing into the exit pore to flow from one direction only and thus the air has a substantial component of velocity in the direction into the pore 20 between the arms 24 of the barrier 22.

When the air is blown through a pore 20, it retains much of this component of motion in the direction parallel to the surface of the sheet. The resultant of this velocity and the component of velocity away from the surface due to the ejection of air from the sheet causes the discharged air to make a substantial angle with the direction normal to the surface or an acute angle with the surface. It may be pointed out that the pores 18 and 20 are not especially inclined or undercut in any direction and are the result of normal etching procedure to provide holes directed straight through the layers. Experience has shown that the discharged air may flow at an angle of under 60° to the surface of the sheet.

In a device such as the airfoil of FIG. 1, the barriers are so disposed that the air flowing into them is flowing in the same direction as the air flowing over the outer surface of the sheet. Thus, if we assume the facing of the airfoil 3 is made by folding a single sheet, the barriers would be disposed oppositely on the portions of the sheet which form the respective faces of the blade so that flow would be discharged downstream on both faces.

FIG. 4 shows a modification of the structure of FIG. 3 which differs only in the omission of bosses 16 on the rear layer 26, which may be otherwise the same as rear layer 14 just described. In this case, the entrance pores 27 in the rear layer are provided by registering pits etched in from both faces of the layer 26. Such a sheet might be a self-supporting sheet if the sheet 26 is made sufficiently thick for the purpose intended, or it might be laid over a core or strut or other support having surface relief as illustrated, for example, in FIGS. 3 and 6 of U.S. Pat. No. 3,732,031.

FIGS. 5 and 6 illustrate a structure which, like that of FIG. 4, does not have bosses on the rear surface of the sheet; otherwise, it differs from that of FIGS. 2, 3, and 4 in that the bosses which separate the two layers and the barriers which direct the flow to the exit pores are formed on the outer surface of the inner layer rather than on the inner surface of the outer layer.

The laminated sheet illustrated in FIGS. 5 and 6 comprises a front layer 31 having a front or outer surface 32 and having fluid exit pores distributed over the surface, preferably in a rectangular array as indicated in FIG. 5. Layer 31 may, therefore, be like layer 11 in FIGS. 2 and 3 except that it does not have the relief on its rear or inner surface. The rear layer 34 is photo-etched to provide distributed bosses 39 on its front surface engaging the inner surface of layer 32. It is also provided with distributed fluid entrance pores 38 which, as in the other form, are disposed intermediate the exit pores in the front layer. Additionally, the machining of the inner layer is such as to provide barriers 42 of a generally U-shape which are so located that an exit pore 40 is located between the arms 44 of the barrier when the layers are registered and bonded together and the barrier provides a unidirectional air entrance 43. It will be seen that the structure of FIGS. 5 and 6 is very much like that of FIG. 4 except that the relief is on the rear layer rather than the front layer, and the action in ejecting the cooling fluid with a significant deviation from the normal direction to the surface remains the same.

It will be seen that all the structures leave no overhanging ill-supported structure of the sheet around the pores readily deformable by the heat and pressure employed in a bonding operation.

Tests have shown the angle of flow from the exit pores to reach 30° to 40° from the normal to the surface, depending upon dimensions of the structure.

Incidentally, it may be pointed out that this structure is shown greatly enlarged in the drawings and that the sheets before etching may be as thin as five to 20 thousandths of an inch. Ordinarily, the outer layer will be relatively thin even if the inner layer is made thicker for strengthening the laminated structure.

The bosses and barriers could be partly formed in both layers, but this is less practicable.

It should be apparent to those skilled in the art that the structure disclosed provides a structure adapted for cooling and with discharge of the cooling fluid at an angle to the normal to the surface, and that the structures are relatively simple and easy to assemble and require no critical alignment of the parts. Also, it includes no structures which may be readily deformed during the bonding operation.

The detailed description of the preferred embodiment of the invention for the purpose of explaining the principles thereof is not to be considered as limiting or restricting the invention, since many modifications may be made by the exercise of skill in the art.

I claim:

1. A porous sheet adapted to be cooled by flow of fluid through the sheet and to discharge the fluid at an acute angle to the front surface of the sheet comprising a front layer defining the front surface of the sheet having outer and inner surfaces and having distributed fluid exit pores extending through the layer and comprising a rear layer abutting and bonded to the inner surface of the front layer, the rear layer having distributed fluid entrance pores extending through the layer out of register with the pores in the front layer, one of the layers having distributed bosses on its surface contiguous to the other layer engaging the other layer so as to define passages for fluid flowing between the layers from the fluid entrance pores to the fluid exit pores, the sheet being characterized by fluid flow barriers on one layer extending partially around the entrance to each said exit pore, the said barriers being oriented so that the flow into each exit pore over a defined area of the sheet is constrained to proceed in a direction consistent with that of all other pores within the defined area.

2. A porous sheet adapted to be cooled by flow of fluid through the sheet and to discharge the fluid at an acute angle to the front surface of the sheet comprising a front layer defining the front surface of the sheet having outer and inner surfaces and having distributed fluid exit pores extending through the layer and comprising a rear layer abutting and bonded to the inner surface of the front layer, the rear layer having distributed fluid entrance pores extending through the layer out of register with the pores in the front layer, the front layer having distributed bosses on its surface contiguous to the rear layer engaging the rear layer so as to define passages for fluid flowing between the layers from the fluid entrance pores to the fluid exit pores, the sheet being characterized by fluid flow barriers on the front layer extending partially around the entrance to each said exit pore, the said barriers being oriented so that the flow into each exit pore over a defined area of the sheet is constrained to proceed in a direction consistent with that of all other pores within the defined area.

3. A porous sheet adapted to be cooled by flow of fluid through the sheet and to discharge the fluid at an acute angle to the front surface of the sheet comprising a front layer defining the front surface of the sheet having outer and inner surfaces and having distributed fluid exit pores extending through the layer and comprising a rear layer abutting and bonded to the inner surface of the front layer, the rear layer having distributed fluid entrance pores extending through the layer out of register with the pores in the front layer, the rear layer having distributed bosses on its surface contiguous to the front layer engaging the front layer so as to define passages for fluid flowing between the layers from the fluid entrance pores to the fluid exit pores, the sheet being characterized by fluid flow barriers on the rear layer extending partially around the entrance to each said exit pore, the said barriers being oriented so that the flow into each exit pore over a defined area of the sheet is constrained to proceed in a direction consistent with that of all other pores within the defined area.

4. A porous sheet adapted to be cooled by flow of fluid through the sheet and to discharge the fluid at an acute angle to the front surface of the sheet comprising a front layer defining the front surface of the sheet having outer and inner surfaces and having distributed fluid exit pores extending through the layer substantially normally to the surfaces of the layer and comprising a rear layer abutting and bonded to the inner surface of the front layer, the rear layer having distributed fluid entrance pores extending through the layer substantially normally to the surfaces of the layer out of register with the pores in the front layer, one of the layers having distributed bosses on its surface contiguous to the other layer engaging the other layer so as to define passages for fluid flowing between the layers from the fluid entrance pores to the fluid exit pores, the sheet being characterized by fluid flow barriers on one layer extending partially around the entrance to each said exit pore, the said barriers being oriented so that the flow into each exit pore over a defined area of the sheet is constrained to proceed in a direction consistent with that of all other pores within the defined area.

* * * * *